(12) United States Patent
Schubert et al.

(10) Patent No.: US 6,800,267 B2
(45) Date of Patent: Oct. 5, 2004

(54) DOPED PRECIPITATED SILICA

(75) Inventors: Jürgen Schubert, Wachtberg (DE); Klaus-Dieter Hellwig, Bad Honnef (DE); Astrid Muller, Mömbris (DE)

(73) Assignee: Degussa AG, Duesseldorf (DE)

( * ) Notice: Subject to any disclaimer, the term of this patent is extended or adjusted under 35 U.S.C. 154(b) by 279 days.

(21) Appl. No.: 09/940,438

(22) Filed: Aug. 29, 2001

(65) Prior Publication Data

US 2002/0061404 A1 May 23, 2002

(30) Foreign Application Priority Data

Sep. 30, 2000 (DE) .......................................... 100 48 616

(51) Int. Cl.$^7$ ....................... C01B 33/193; C09D 17/00; C09D 129/04

(52) U.S. Cl. ....................... 423/335; 423/338; 423/339; 106/287.34; 106/482; 106/489; 106/266; 162/181.6

(58) Field of Search .................................. 423/335, 338, 423/339; 106/482, 489, 287.34, 266; 162/181.6

(56) References Cited

U.S. PATENT DOCUMENTS

| | | | |
|---|---|---|---|
| 3,424,602 A | | 1/1969 | Nauroth et al. ............. 423/339 |
| 4,495,167 A | | 1/1985 | Nauroth et al. ........... 423/328.1 |
| 5,484,581 A | * | 1/1996 | Esch et al. ................... 423/335 |
| 5,484,681 A | | 1/1996 | Cunningham et al. ...... 430/130 |
| 5,720,806 A | * | 2/1998 | Fujii et al. .................... 106/483 |
| 5,800,608 A | | 9/1998 | Bomal et al. ................ 423/335 |
| 5,852,099 A | | 12/1998 | Vanel .......................... 423/339 |
| 6,279,633 B1 | * | 8/2001 | Corvasce ..................... 152/525 |
| 2003/0185739 A1 | * | 10/2003 | Mangold et al. ............ 423/335 |

FOREIGN PATENT DOCUMENTS

| | | |
|---|---|---|
| DE | 1 074 559 | 2/1960 |
| DE | 1 172 245 | 6/1964 |
| DE | 31 44 299 | 5/1983 |
| EP | 0 493 263 | 7/1992 |
| EP | 0 798 266 | 10/1997 |

OTHER PUBLICATIONS

Technical Information Sheet TI 1212, 6 pages, "Degussa–Huels Synthetic Amorphous Silicas For Ink Jet Media".

* cited by examiner

Primary Examiner—Ngoc-Yen Nguyen
(74) Attorney, Agent, or Firm—Oblon, Spivak, McClelland, Maier & Neustadt, P.C.

(57) ABSTRACT

Aluminum-doped precipitated silicas having a BET surface area of more than 300 m$^2$/g and aluminum distributed uniformly in the silica particles are prepared by sequentially heating a mixture of water and sodium silicate at a temperature of from 70 to 86° C. and adding sulfuric acid until half of the sodium silicate is neutralized, then aging the mixture for a time of from 30 to 120 minutes, adjusting the pH of the mixture with sulfuric acid to a range of from 3.0 to 7.0, thereby precipitating the aluminum-doped silica, filtering the aluminum-doped silica from the mixture to form a filtercake and washing the filtercake, followed by drying and/or grinding the washed filtercake. An aluminum salt solution is metered into the mixture at step a) and/or step c). The aluminum-doped precipitated silicas of the present invention may be used in coatings for paper and other media intended for ink jet printing.

18 Claims, No Drawings

DOPED PRECIPITATED SILICA

BACKGROUND OF THE INVENTION

1. Field of the Invention

The invention relates to a precipitated silica doped with alumina, a process for preparing a precipitated silica doped with alumina, and coating compositions comprising precipitated silica doped with alumina.

2. Discussion of the Background

Silicas and aluminum silicates may be prepared by precipitation from solutions of sodium silicate with sulfuric acid, or by precipitating solutions of sodium silicate by the addition of a soluble metal salt. In these known processes, salts or solutions of metal ions, for example, Zr, Ti, or Zn ions, may be added in a variety of ways. These ions may also bond with constituents of the silica/silicate surface to generate cationic charges on the surface of the silicas/silicates, and therefore may be not removed by simple washing. Such cationic silicas/silicates may be used, for example in coatings for ink jet papers to fix the anionic dyes typically employed in ink jet printing inks, and ensure bright colors in the paper coating.

In the paper industry, there is a need for fillers for media designed for ink jet printing which effectively absorb ink jet printing ink and maintain the brightness of the colors. In addition, rapid ink drying is vital to allow increased printing speed and to reduce the size of the printed dot. One way of meeting these requirements is to apply coatings containing silica to the media. These coatings permit rapid ink absorption, enhance the dot definition, and promote the defined circular propagation of the ink droplet. Furthermore, they prevent showthrough or strikethrough of the ink and produce high color densities.

Thus, in the paper industry, there is a need for fillers which are extremely easy to disperse, which when used in ink jet paper or inkjet film, for example, absorb the ink readily, and which maintain brightness of the ink colors.

SUMMARY OF THE INVENTION

Accordingly, it is an object of the present invention to provide aluminum-doped silicas in which the aluminum has been substantially embedded into the silicate structure.

It is second object of the present invention to provide a process for preparing aluminum-doped precipitated silica.

It is a third object of the present invention to provide a coating formulation comprising an aluminum-doped precipitated silica.

DETAILED DESCRIPTION OF THE INVENTION

Thus, in a first embodiment, the present invention provides aluminum-doped precipitated silicas which have a BET surface area of more than 300 $m^2/g$, preferably from 350 to 800 $m^2/g$, most preferably from 350 to 600 $m^2/g$. In addition, the aluminum is distributed uniformly, i.e., throughout the entire volume of the silica particle. Thus, even if the aluminum-doped silicas of the present invention are ground or abraded in subsequent processing steps, aluminum is always present at or on the surface of the particle.

In addition, the silica of the present invention preferably has one or more of the following properties: an $Al_2O_3$ content of from 0.05 to 0.5% by weight, preferably from 0.05 to 0.25% by weight; DBP absorption (i.e., dibutyl phthalate absorption) of from 500 to 200 g/100 g, preferably from 250 to 350 g/100 g; average particle size (i.e., Malvern $d_{50}$) of less than 15 $\mu$m, preferably from 5 to 12 $\mu$m, and in particular from 10 to 12 $\mu$m.

In a second embodiment, the present invention provides a process for preparing the aluminum-doped precipitated silicas, which comprises successively:

a) heating a mixture of water and sodium silicate at from 70 to 86° C. and adding sulfuric acid until half of the sodium silicate is neutralized, b) aging the mixture for from 30 to 120 minutes, c) adjusting the mixture to a pH of from 3.0 to 7.0 by adding sulfuric acid, d) filtering the mixture and washing the filtercake, e) spray-drying and/or grinding the washed filtercake, with the proviso that an aluminum salt solution is metered into the reaction mixture at steps a) and/or c) of the process, thereby providing precipitated silica which has a BET surface of more than 300 $m^2/g$, and aluminum distributed uniformly throughout the silica particles. Unlike conventional processes for preparing aluminum-doped silicas, the aluminum-doped silicas prepared by process of the present invention have aluminum chemically bonded and/or physically fixed in the structure of the silica.

The preparation of doped and undoped silicas and silicates has already been extensively described, for example in U.S. Pat. No. 5,484,581, DE 117 22 45, EP 0 798 266, U.S. Pat. Nos. 4,495,167 or 3,424,602, each of which is herein incorporated by reference.

All of the precipitation processes described in the above-references for preparing silica comprise three process steps:

1.) Mixing water and a sodium silicate solution, and optionally adjusting the pH, and/or conductivity of the resulting solution by adding salts (e.g., sodium sulfate) or solutions of salts to the mixture;

2.) Precipitating the silica to form a silica/silicate suspension by adding a mineral acid such as sulfuric acid;

3.) Acidifying the silica/silicate suspension prior to further workup.

All three steps are carried out at specific temperature and pH ranges, and the raw materials are metered into the reaction at specific rates. In addition, the process may be interrupted at particular stages and/or intermediate stages, or different salts or solutions thereof may be added.

In order to produce cationic sites on the surface of the silicas/silicates, at least one divalent metal ion may added to the precipitated silica (i.e., as described in EP 0 493 263, herein incorporated by reference). These metals may comprise alkaline earth metals, rare earth metals, transition metals (e.g., Ti, Zr, Fe, Ni, Zn), or aluminum. These metals may be added as ions in the form of their salts or as solutions thereof. The salts may comprise organic salts or complexes, for example, carbonates, polycarbonates; or inorganic salts such as halides, oxyhalides, nitrates, phosphates, sulfates, oxide sulfates, hydroxides, or oxide hydroxides.

These ions are particularly active and effective if they are integrated (i.e., chemically bonded and/or physically fixed) in the surface of the silicas or silicates. However, simply treating an already precipitated silica or silicate (or suspensions thereof) with salts or solutions of these ions is not sufficient to integrate the ions into the surface. For example, EP 0 492 263 describes processes for preparing silicas which are treated with metal ions after precipitation of the silica particles. Metal salts for doping the silica/silicates are applied either to pre-prepared and re-suspended silica or to silica suspensions which have already been subjected to precipitation but not yet filtered. In both cases, although the metal ions are deposited on the surface of the particles, there is no chemical incorporation of the metals into the silicate structure. Doped silicas prepared in this way "bleed" easily, releasing the metal ions.

In addition, in order to obtain a particular, desired particle size, it is often necessary to grind the silica, and even unground silicas are often exposed in further processing steps to mechanical stresses (e.g., by mixing or kneading) which lead to the partial destruction of the original particles. When such silica particles, which have been doped only on the surface with foreign metals, are broken down, these smaller particles often have surfaces which lack the foreign metal atoms.

The doping of the silicas of the present invention is preferably carried out with $Al_2O_3$. When other aluminum compounds are used, the mass fraction of aluminum is generally calculated as the mass fraction of $Al_2O_3$.

The precipitated aluminum-doped silicas obtained by this process may then be filtered off and used subsequently in the form of a filtercake redispersed in water, or after drying the filtercake (e.g., in a spray dryer, a nozzle tower dryer, a spin flash dryer, a Büttner dryer, or a rotary tube furnace) and grinding (dry or wet, e.g., in a wet-jet mill).

The above-discussed aluminum compounds may be added in the form of their salts, for example as chloride, nitrate, carbonate, oxide, hydroxides oxychloride, phosphate, oxyhydroxide, oxide sulfate, polycarbonate and/or sulfate salts, at different points in time and at different stages of the process of the present invention, i.e., the precipitation stage. It is possible to add an aluminum salt solution to the mixture continuously during steps a) and/or c) of the process. Furthermore, the aluminum salt solution may be added discontinuously (i.e., as discrete volumes of solution) to the mixture in step a) and/or in step c) of the process, in each case prior to the addition of the sulfuric acid. Whether the aluminum salt is added continuously or discontinuously, even small amounts of added aluminum provide optimum incorporation (or good physicochemical bonding) of the aluminum ions to the still-growing silica/silicate surface, and a high effective concentration at the surface of the silica particles. It should be emphasized that when silicas/silicates are doped with aluminum in this manner, the aluminum can only be removed from the silica/silicate by destroying the silica/silicate structure.

When the aluminum salts are added during the precipitation step, they are also incorporated into the internal structure of the silica/silicate. In this way, even if the silica/silicate is subsequently ground (dry or wet grinding) to obtain the optimum particle size, the ground particles thus obtained have cationic sites on their entire surface. However, using this method, the percentage fraction of the aluminum on the surface of the particles may be a multiple of the weight percentage of aluminum averaged over the entire particle mass, especially if the addition is made at the end of the addition of the sulfuric acid. Thus, silicas prepared according to the process of the present invention may have a higher concentration of aluminum at the surface of the particle, if the aluminum is added at the end of the precipitation. Otherwise, the aluminum concentration in the silica particle is approximately constant throughout the particle.

In another embodiment of the process of the present invention, one or more of steps a), b), and c) of the process may be carried out with shearing, using for example a Dispax reactor.

It is also possible to add the aluminum salt in a sulfuric acid solution. Aluminum sulfate may be carefully dissolved in the sulfuric acid which is also used to precipitate the silica.

The general parameters of the precipitation reaction, such as temperature, stirring speed, concentration of the sodium silicate solution or sulfuric acid introduced correspond to those parameters which are suitable for the preparation of undoped precipitated silicas for example, as described in from DE 117 22 45, EP 0 798 266, U.S. Pat. No. 4,495,167 or DE 3424602.

Methods of Using the Aluminum-Doped Precipitated Silicas of the Present Invention Modern inks are anionic in nature, particularly those used in all varieties of what is known as ink jet printing and its related processes. Therefore, in order to fix the colorants (e.g., dyes and pigments), the brightness of the color, and the depth and definition of printing in the ink to the printing medium or substrate (e.g., paper or plastic film), it is very important that such printing media have on their surface, or in their surface regions, particles having an at least partly cationic surface.

Silicas and silicates are presently already widely used in coating formulations for e.g., paper coating, film coating. Thus, modification of these silicas and silicates so as to generate active, i.e., available, cationic sites on their surface, as in the present invention, provides a means for fixing the anionic colorants that are typically used.

A third embodiment of the present invention, provides coating formulations comprising the aluminum-doped silicas/silicates of the present invention.

Because of the influence of the incorporated metal ions on the refractive index, the silicas of the present invention may also provide advantages when used in coatings for transparent media, such as for films. Accordingly, the aluminum-doped silicas of the present invention, and silicas prepared by the process of the present invention, may be used as an additive in the production of printable media, or as flatting agents.

In particular, silicas of the present invention may be used in coatings, for example, coatings for ink jet papers, and in coatings for other printable media, such as films, including overhead films, or printable textiles, fabric screens, or paper in general.

The silicas of the present invention may be used not only in the form of dried and optionally ground products, but also as dispersions. Dispersed filter cakes of the precipitated silicas/silicates of the present invention also may provide advantages in further processing, and cost.

The precipitated silicas of the present invention may further be hydrophobicized, completely or partially, by treatment with silanes, as described, for example, in DE 117 22 45, EP 0 798 266, U.S. Pat. No. 4,495,162 or DE 107 45 59 (herein incorporated by reference).

For papermaking applications, dispersions of the silicas of the present invention may be mixed with auxiliaries customarily used in the paper industry, such as polyalcohols, polyvinyl alcohol, synthetic or natural polymers, pigments ($TiO_2$, Fe oxides, Al metal filters), but also undoped silicas (precipitated silicas or Aerosils).

The present invention further provides colored coating formulations for paper, comprising polyvinyl alcohol and aluminum-doped precipitated silica having a BET surface area of more than 300 $m^2/g$, in which the aluminum is distributed uniformly in the silica particles, in the form of a suspension having a solids content of from 10 to 30% by weight. The aluminum-doped precipitated silica may be prepared as described above. The colored coating formulations of the invention may further comprise additional components such as water, latex, styrene acrylate, polyvinyl acetate and/or polyvinylpyrrolidone.

The precipitated aluminum-doped silica of the present invention may be used in coatings as a flatting agent. In addition to the aluminum-doped silica of the present invention, the coating may contain, for example, alkyd resin coating materials or other baking enamels.

The examples which follow are intended to illustrate the invention without restricting its scope.

The formulation described as "standard" comprises not only precipitated silica but also pyrogenic silica, which likewise contributes to increasing the color brightness. Accordingly, it is clear that coatings containing the precipitated silica of the present invention provide superior ink jet printing properties even without the addition of pyrogenic silicas.

EXAMPLES

Examples A1–A3

A precipitating vessel was charged with 47 kg of water and 16 kg of sodium silicate (d=1.35 g/cm$^3$, modulus SiO$_2$:Na$_2$O=3.3) and the mixture was heated with stirring to 75° C. Sulfuric acid (50%, d=1.340 g/cm$^3$) was then metered into this initial precipitation charge over 30 minutes at a rate of 41.2 ml/min. At the same time, an aluminum sulfate solution (d=1.284 g/cm$^3$, 7.38% by weight) was metered into the mixture of sodium silicate and sulfuric acid by means of a second feed point. After precipitation for 25 minutes, a shearing unit (Dispax reactor) was switched on. Shortly after the end of the addition of sulfuric acid, the silica began to flocculate. The supply of acid was then halted for 60 minutes (waiting stage). Thereafter, the addition of sulfuric acid was continued at a rate of 47.2 ml/min over a period of an additional 35 minutes, with simultaneous addition of aluminum sulfate. Subsequently, the resulting silica suspension had a pH of 3.4 and a solids content of 73.5 g/l. The shearing unit was then switched off.

The suspension was passed through a filter press and washed free of sulfate. The filtercake was spray dried and the powder ground to a d$_{50}$ value of from 10.5 to 11.5 μm and subsequently classified.

The dried product had the following physicochemical properties:

| Designation | Unit | Comparative Example A1 | Example A2 | Comparative Example A3 |
|---|---|---|---|---|
| Al$_2$(SO$_4$)$_3$ solution | [l] | 0 | 0.26 | 2.25 |
| Metering rate | [ml/min] | 0 | 4 | 35 |
| pH | | 6.0 | 7.1 | 6.4 |
| Specific surface area | [m$^2$/g] | 280 | 315 | 305 |

-continued

| Designation | Unit | Comparative Example A1 | Example A2 | Comparative Example A3 |
|---|---|---|---|---|
| DBP absorption | [g/100 g] | 320 | 310 | 240 |
| Pressed density | [g/l] | 70 | 70 | 110 |
| Particle size distribution (Malvern) | | | | |
| d$_{10}$ | [μm] | 5.1 | 4.8 | 4.7 |
| d$_{50}$ | [μm] | 11.4 | 11.0 | 10.1 |
| d$_{90}$ | [μm] | 21.2 | 20.7 | 18.3 |
| Al$_2$O$_3$ content | [%] | 0 | 0.5 | 3.8 |

Examples B1–B3

Colored coating slips were formulated on the basis of pure silica with a solids content of 15% and also 14% to 18%. The Brookfield viscosity was measured at 5, 10, 20, 50, and 100 rpm 1 day after preparing the coating slips. The colored coating slips prepared are applied to standard untreated paper with subsequent drying and calendering of the paper samples. The print test is carried out in four-color printing using an HP Deskjet 550° C. and an Epson Stylus Color 800.

The overall evaluation encompasses the ease of incorporation, the coating behavior, the coating adhesion, the absorption behavior and the printability.

In order to prepare the colored coating slips for ink jet printing applications, for example, and especially for the standard formulation, the polyvinyl alcohol (PVA) were introduced in portions into the total amount of water, and dissolved at 95° C. Subsequently the silica or the silica mixture (precipitated and pyrogenic silica) were incorporated into the mixture at 1000 rpm and then dispersed at 3000 rpm for 30 minutes.

The colored coating slips were not mixed, as usual, with additives and cobinders, and the colored coating slip formulation was not further enhanced for optimum properties. Coating slip formulations for different media are provided, inter alia, in Technical Information Bulletin No. 1212 from Degussa-Hüls, FP Division, herein incorporated by reference. The use of the precipitated silicas of the present invention in coatings may also be applied to other formulations.

The colored coating slip samples were applied to sheets of paper (DIN A4) using a Dow coater at 50 m/min. The papers were dried in a Dow tunnel dryer, and glazed by means of a calender at 9 bar/45° C. The papers so coated were then four-color printed using an HP 550° C. and an Epson Stylus Color 800.

| Designation | Unit | Comparative Example B1 | Example B2 | Comparative Example B3 | Standard formulation |
|---|---|---|---|---|---|
| Precipitated silica | | Comparative Example A1 | Example A2 | Comparative Example A3 | Sip. 30/MOX 170 |
| solids content | [g/l] | 14 | 16 | 18 | 15 |
| viscosity (Brookfield) after agitation [mPa*s] | 5 rpm | 10240 | 6880 | 720 | 360 |
| | 10 rpm | 5680 | 4520 | 640 | 420 |
| | 20 rpm | 3180 | 3000 | 640 | 385 |
| | 50 rpm | 1620 | 1830 | 680 | 300 |
| | 100 rpm | 1030 | 1315 | 680 | 250 |
| Adhesion of coating | | moderate | moderate | moderate | good |

-continued

| Designation | Unit | Comparative Example B1 | Example B2 | Comparative Example B3 | Standard formulation |
|---|---|---|---|---|---|
| Smoothness of the coating | | moderate-rough | moderate | smooth | smooth-moderate |
| Evaluation of printability using the HP 550 C | | | | | |
| Color intensity | Magenta/yellow/cyan | 3+ | 1 | 3+ | 2 |
| | Black | 2− | 2+ | 2− | 2 |
| Dot definition | Black in color | 2 | 2+ | 2+ | 3 |
| Transitions | Color in color | 1 | 1 | 1 | 1 |
| Dot density | Black print | 2− | 2+ | 2− | 2 |
| | Black contours | 2+ | 2+ | 2+ | 3− |
| Half tone | | 1− | 1 | 1 | 2+ |
| Sum of evaluation | | 14 | 10 | 13.25 | 15.25 |
| Evaluation of printability using the Epson Stylus Color 800 | | | | | |
| Color intensity | Magenta/yellow/cyan | 2− | 2+ | 2+ | 2 |
| | Black | 1− | 1 | 1 | 2+ |
| Dot definition | Black in color | 2+ | 1 | 1 | 2 |
| Transitions | Color in color | 1− | 1 | 1 | 1 |
| Dot density | Black print | 1− | 1 | 1 | 2+ |
| | Black contours | 1− | 1 | 1 | 2+ |
| Half tone | | 1− | 1 | 1 | 1− |
| Sum of evaluation | | 11.75 | 7.75 | 7.75 | 11.75 |

The overall evaluation of viscosity, coating, and printability shows the advantage of the aluminum-doped precipitated silica of the invention with regard to its use in ink jet media.

Obviously, numerous modifications and variations on the present invention are possible in light of the above teachings. It is therefore to be understood that within the scope of the appended claims, the invention may be practices otherwise than as specifically described herein.

The priority document of the present application, German application 10048616.9, filed Sep. 30, 2000, is incorporated herein by reference.

| Color Intensity | | | | Dot definition | | Transitions | | Dot definition | | | | Halftone print |
|---|---|---|---|---|---|---|---|---|---|---|---|---|
| Magenta/yellow/cyan | | Black | | Black in color | | Color in color | | Black print | | Black contours | | Color intensity/contours |
| 1+ | Bright, vigorously intensive | 1 | Full color, vigorously intensive | 1 | Clear separation, very good to good definition | 1 | Clear separation, clearly delimited | 1 | Full color, vigorously intensive | 1 | Clear separation, very good to good definition | 1 | Gray shade, optimally clear, fine lines delimited |
| 1 | Matt, vigorously intensive | | | 2 | Slight running, still good to moderate definition | 2 | Slight running, still good delimitation | | | 2 | Slight running, still good to moderate definition | 2 | Gray shade fused, fine lines delimited |
| 2 | Matt, pale | | | | | 3 | Running, some fusion | | | | | 3 | Gray shade optimally clear, fine lines fused |
| 3+ | Bright, flecked | 4 | Bleached, pale color | 4 | Bled, run, fused | | | 4 | Bleached, pale color | 4 | Bled, run, fused | 4 | Gray shade fused, fine lines fused |
| 3 | Matt, flecked | | | 5 | Severe running, legible | 5 | Severe running | | | 5 | Severe running, barely legible | 5 | Gray shade dark to black, fine lines fused |

| Color Intensity | | | | | | | | Halftone print | |
| --- | --- | --- | --- | --- | --- | --- | --- | --- | --- |
| Magenta/ yellow/cyan | | Black | | Dot definition Black in color | | Transitions Color in color | | Dot definition Black print | Black contours | Color intensity/contours |
| 3– | Vigorously intensive, marbled | 6 | Very highly bleached color and/or marbled | 6 | Very severe running, undefined illegible | 6 | Very severe running, new colors in the overlap region | 6 | Very highly bleached color and/or marbled | 6 | Very severe running, into the area, undefined, illegible | 6 | Gray shade completely colored black, fine lines barely perceptible |
| 4 | Matt, marbled | | | | | | | | | |
| 5 | Pale, marbled | | | | | | | | | |
| 6 | Very matt and/or marbled | | | | | | | | | |

What is claimed as new and is intended to be secured by Letters Patent is:

1. An aluminum-doped precipitated silica having a BET surface area of more than 300 m$^2$/g, wherein said aluminum-doped precipitated silica has an $Al_2O_3$ content of from 0.05 to 0.25% by weight, and wherein aluminum is distributed uniformly in the silica.

2. The aluminum-doped precipitated silica of claim 1, wherein the BET surface area is 350 to 800 m$^2$/g.

3. The aluminum-doped precipitated silica of claim 1, wherein the aluminum is in the form of $Al_2O_3$.

4. The aluminum-doped precipitated silica of claim 1, wherein the silica is in the form of particles having an average size of less than 15 μm.

5. The aluminum-doped precipitated silica of claim 1, wherein the silica is in the form of particles having an average size of 5 to 12 μm.

6. The aluminum-doped precipitated silica of claim 1, having a DBP absorption of from 200 to 500 g/100 g.

7. The aluminum-doped precipitated silica of claim 1, having a DBP absorption of from 250 to 350 g/100 g.

8. A process for preparing aluminum-doped precipitated silica, comprising;
   a) heating a mixture of water and sodium silicate at a temperature of from 70 to 86° C. and adding sulfuric acid until half of the sodium silicate is neutralized; next
   b) aging the mixture for a time of from 30 to 120 minutes; next
   c) adjusting the pH of the mixture with sulfuric acid to a range of from 3.0 to 7.0, thereby precipitating the aluminum-doped silica; next
   d) filtering the aluminum-doped silica from the mixture to form a filtercake and washing the filtercake; next
   e) drying and/or grinding the washed filtercake,
   wherein an aluminum salt solution is metered into the mixture at step a) and/or step c), the precipitated aluminum-doped silica has a BET surface of more than 300 m$^2$/g, an $Al_2O_3$ content of from 0.05 to 0.25% by weight, and the aluminum is distributed uniformly in the aluminum-doped silica.

9. The process of claim 8, wherein the aluminum salt solution is added to the mixture of water and sodium silicate in step a) of the process, prior to adding the sulfuric acid.

10. The process of claim 8, wherein the aluminum salt solution is added continuously during step a) and/or step c).

11. The process of claim 8, wherein the aluminum salt solution is added in step c) and prior to adding the sulfuric acid.

12. The process of claim 8, wherein at least one or more of steps a), b), and c) are carried out with shearing.

13. A coating comprising the aluminum-doped precipitated silica of claim 1.

14. Paper coated with the coating of claim 13.

15. Plastic film coated with the coating of claim 13.

16. Fabric screen coated with the coating of claim 13.

17. A flatting agent comprising the silica of claim 1.

18. The coating of claim 13, further comprising polyvinyl alcohol, wherein the coating has the form of a suspension having a solids content of from 10 to 30% by weight.

* * * * *